(12) United States Patent
Weber et al.

(10) Patent No.: US 10,697,511 B2
(45) Date of Patent: Jun. 30, 2020

(54) DISC BRAKE FOR A UTILITY VEHICLE

(71) Applicant: KNORR-BREMSE Systeme fuer Nutzfahrzeuge GmbH, Munich (DE)

(72) Inventors: Ralf Weber, Munich (DE); Matthias Klingner, Moorenweis (DE); Stipo Grgic, Hurlach (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 135 days.

(21) Appl. No.: 15/975,138

(22) Filed: May 9, 2018

(65) Prior Publication Data
US 2018/0259021 A1 Sep. 13, 2018

Related U.S. Application Data

(63) Continuation of application No. PCT/EP2016/076996, filed on Nov. 8, 2016.

(30) Foreign Application Priority Data

Nov. 9, 2015 (DE) ........................ 10 2015 119 194

(51) Int. Cl.
*F16D 65/56* (2006.01)
*F16D 55/2255* (2006.01)
*F16D 65/18* (2006.01)

(52) U.S. Cl.
CPC ....... *F16D 65/568* (2013.01); *F16D 55/2255* (2013.01); *F16D 65/183* (2013.01)

(58) Field of Classification Search
CPC .... F16D 65/568; F16D 65/183; F16D 65/079; F16D 55/2265; F16D 55/2255; F16D 2121/14; F16D 2125/40; F16D 2125/26

(Continued)

(56) References Cited

U.S. PATENT DOCUMENTS 5,927,445 A 7/1999 Bieker et al.
7,331,431 B2 2/2008 Fischer et al.
(Continued)

FOREIGN PATENT DOCUMENTS

CN 1388875 A 1/2003
CN 1409804 A 4/2003
(Continued)

OTHER PUBLICATIONS

English translation of DE 102015105344 obtained from website: https://worldwide.espacenet.com on Nov. 12, 2019.*

(Continued)

*Primary Examiner* — Pamela Rodriguez
(74) *Attorney, Agent, or Firm* — Crowell & Moring LLP (57) ABSTRACT

A disc brake for a utility vehicle has a brake caliper engaging over a brake disc, at least one application device for applying the disc brake by way of a displaceably guided bridge, which bridge has at least one threaded hole, into which an actuating spindle passing through a closure plate connected to the brake caliper and provided with an external thread is screwed. The spindle bears a pressure piece which can be rotated relative thereto, by which pressure piece a brake pad can be pressed against the brake disc. A readjusting device is operatively connected to the actuating spindle for readjusting a clearance. A securing ring is provided, which is held on the bridge so as to be secured axially and against rotation and which, in an end position of the actuating spindle screwed in counter to the actuating direction, in order to secure the actuating spindle against rotation, engages with a form fit in a thread-free end region of the actuating spindle which is assigned to the pressure piece.

20 Claims, 7 Drawing Sheets

(58) Field of Classification Search
USPC .............. 188/71.9, 71.7, 71.8, 196 D, 196 F, 188/196 V, 369, 73.38
See application file for complete search history.

(56) References Cited

U.S. PATENT DOCUMENTS

| | | | |
|---|---|---|---|
| 9,194,448 B2 | 11/2015 | Gruber et al. | |
| 10,443,667 B2 * | 10/2019 | Schoefberger | ........ F16D 65/183 |
| 2003/0006105 A1 | 1/2003 | Wang | |
| 2004/0026181 A1 | 2/2004 | Baumgartner et al. | |
| 2006/0144652 A1 | 7/2006 | Wimmer et al. | |
| 2008/0314695 A1 | 12/2008 | Kim | |
| 2012/0292137 A1 | 11/2012 | Yoshikawa et al. | |
| 2014/0174862 A1 | 6/2014 | Gruber et al. | |
| 2018/0223933 A1 * | 8/2018 | Fuchs | ................ F16D 55/2255 |

FOREIGN PATENT DOCUMENTS

| | | |
|---|---|---|
| CN | 200989401 Y | 12/2007 |
| CN | 101332812 A | 12/2008 |
| CN | 102770685 A | 11/2012 |
| DE | 94 22 342 U1 | 4/2000 |
| DE | 102 53 642 A1 | 6/2004 |
| DE | 696 33 257 T2 | 9/2005 |
| DE | 10 2011 112 360 A1 | 3/2013 |
| DE | 10 2014 114 276 A1 | 4/2015 |
| DE | 102015105344 A1 * | 2/2016 |
| EP | 0 703 380 A1 | 3/1996 |
| EP | 1 627 160 B1 | 7/2008 |
| JP | 2006-250325 A | 9/2006 |
| WO | WO 97/01045 A1 | 1/1997 |

OTHER PUBLICATIONS

International Preliminary Report on Patentability (PCT/IB/326 & PCT/IB/373) issued in PCT Application No. PCT/EP2016/076996 dated May 24, 2018, including English translation of document C2 (German-language Written Opinion (PCT/ISA/237) previously filed on May 9, 2018) (six (6) pages).
German-language Office Action issued in counterpart German Application No. 10 2015 119 194.6 dated Aug. 25, 2016 (seven pages).
International Search Report (PCT/ISA/210) issued in PCT Application No. PCT/EP2016/076996 dated Feb. 16, 2017 with English translation (five pages).
German-language Written Opinion (PCT/ISA/237) issued in PCT Application No. PCT/EP2016/076996 dated Feb. 16, 2017 with English translation (nine pages).
Chinese-language Office Action issued in counterpart Chinese Application No. 201680076307.7 dated Mar. 27, 2019 with English translation (11 pages).

* cited by examiner

DISC BRAKE FOR A UTILITY VEHICLE

CROSS REFERENCE TO RELATED APPLICATIONS

This application is a continuation of PCT International Application No. PCT/EP2016/076996, filed Nov. 8, 2016, which claims priority under 35 U.S.C. § 119 from German Patent Application No. 10 2015 119 194.6, filed Nov. 9, 2015, the entire disclosures of which are herein expressly incorporated by reference.

BACKGROUND AND SUMMARY OF THE INVENTION

The invention relates to a disc brake for a utility vehicle having a brake caliper engaging over a brake disc, and at least one application device for applying the disc brake by way of a displaceably guided bridge, wherein the bridge has at least one threaded borehole, into which an actuating spindle passing through a closure plate connected to the brake caliper and provided with an external thread is screwed. The spindle bears a pressure piece, which can be rotated relative thereto, by which pressure piece a brake pad can be pressed against the brake disc.

A disc brake of this kind is disclosed in DE 94 22 342 U1. This disc brake comprises a brake lever, which acts on the bridge during a braking process, in which at least one actuating spindle is mounted and able to rotate by means of a threaded pair. The spindle has a pressure piece, which is pressed against a brake disc when the brake is activated by displacement of the bridge.

In order to cancel out a wear-related change in a predetermined clearance, i.e., the distance between the brake pad and the brake disc, a readjusting device is provided, with which the actuating spindle is adjusted by rotation in the direction of the brake disc. For this, the actuating spindle is provided with an external thread, which engages with a corresponding threaded borehole of the bridge.

A receiving space of the brake caliper, in which the bridge and the brake lever are positioned, is closed on the outside, i.e., toward the brake disc, by a closure plate, through which the actuating spindle passes.

In order to seal off this passageway, there is provided a bellows, which is held on the one hand against the closure plate and on the other hand against the pressure piece. This usually consists of a highly elastic material, such as a silicone rubber, so that it can cover the actuating spindle over the entire adjustment range. For the resetting of the bridge after a braking event, a compression spring is arranged between the closure plate and the bridge.

Problems occur in terms of loading capacity, i.e., the service life of the bellows, since the relatively high temperatures during a braking process act on the bellows, and so the bellows must be replaced as the part wears.

However, due to the narrow space conditions, this can only be done with considerable labor, having a definite negative influence on the servicing costs of the disc brake.

Apart from the time expenditure, in order to replace the bellows, and also to replace the brake pad, the actuating spindles are rotated back via the readjusting device, wherein in order to protect it during the backward and forward movement a breakaway adapter is used, which breaks upon passing a certain torque and thereby protects an adjuster of the readjusting device against excessive loading. Furthermore, a release protection of the readjusting device is needed, or else the actuating spindle will be axially strained against the adjuster, with the result that a larger torque is needed for the releasing than the breakaway adapter can transmit.

The problem which the invention proposes to solve is to modify a disc brake of this kind so that it is more simple and economical to produce and install, and the replacement of worn parts is made easier and avoids damaging of the functional parts involved in the replacement.

This problem is solved by a disc brake in accordance with embodiments of the invention.

The new disc brake is characterized, first of all, in that it is much easier to produce than heretofore. In particular, the release protection of the readjusting device mentioned in the prior art can be omitted, since a reversing protection is created by a securing ring provided according to the invention.

In this way, a reversing stop is created for the actuating spindle, by which the aforementioned problem of the axial strain of the actuating spindle is prevented.

The securing ring provided for this according to the invention, which is held on the bridge so as to be secured axially and against rotation, then engages with a form fit in the actuating spindle when the latter has reached an end position screwed into the bridge counter to the application direction, so that the securing ring prevents the actuating spindle from being rotated further back into a position in which said axial straining of the actuating spindle would be possible.

Because this is effectively prevented, the long-term functionality of the breakaway adapter is also assured, especially since the driving force of the breakaway adapter is sufficient during the subsequent forward rotation of the actuating spindle. Obviously, this improves the functional reliability, and also the repair work, which may result from the malfunctioning of the actuating spindle in the prior art, is no longer necessary.

The form fit provided by the invention between the securing ring and the actuating spindle in its thread-free end region can be accomplished in that the securing ring has form fit elements which engage with the actuating spindle in the mentioned position, so that its rotation is blocked.

Corresponding to the form fit elements of the securing ring, the actuating spindle has, at least in the thread-free end region, axial grooves which engage with the form fit elements of the securing ring when the end position of the actuating spindle is reached.

In order to enable a free turning of the actuating spindle with respect to the stationary securing ring outside of the mentioned end position, the thread-free end region of the actuating spindle which receives the axial grooves is increasingly larger in diameter than the threaded region. For this purpose, the end region may be configured as an encircling fillet, which passes into a head against which the pressure piece is supported. That is, the axial grooves effectively form a curved indentation of this fillet.

For the holding of the securing ring stationary in relation to the bridge, i.e., for a rotational and axial securing, according to another aspect of the invention the securing ring is held against the bridge by a preferably frictionally secured holding ring. For this, the holding ring has an encircling collar, extending axially to the actuating spindle, whose clear diameter is chosen such that a press fit with a corresponding shoulder of the bridge results.

Radially inward, i.e., at an angle relative to the actuating spindle, a contact leg is formed on the collar, forming an axial securement for the securing ring, which is furthermore inserted in a groove produced concentric to the shoulder of the bridge, the clear diameter of the passageway for the actuating spindle that is bounded by the contact leg being larger than the diameter, especially the thread diameter, of the actuating spindle, so that it can rotate freely.

For the rotational locking of the securing ring, the holding ring has at least one cut-out in the region of the radial contact leg, through which passes a somewhat axially angled tab of the securing ring, lying against the boundary walls of the cut-out in the rotating direction of the actuating spindle.

The tab, preferably several of them being provided evenly distributed about the circumference, is moreover shaped such that it lies against the actuating spindle for radial bracing of the securing ring. Outside of the tabs, the clear diameter of the securing ring is likewise larger than the diameter of the actuating spindle, especially in the thread region.

For the reversing protection of the actuating spindle, the securing ring has, as a form fit element, at least one tongue protruding radially inward, which then engages in the rotating direction by form fit with the axial groove of the actuating spindle when its curved portion, during an axial adjusting movement of the actuating spindle, assumes a position in which the tongue protrudes into the axial groove.

Advantageously, several axial grooves are provided in the actuating spindle, arranged parallel to and at a distance from each other, being situated at the same angular distance relative to each other, as are the tongues engaging with them in the aforesaid position of the actuating spindle.

Other design solutions are also contemplated for the immovable holding of the securing ring relative to the bridge. For example, the securing ring may be held by press fit against the bridge, the frictional forces holding the securing ring being larger than the forces applied for the backward rotation of the actuating spindle. This equally holds for the frictional forces by which the holding ring is held against the bridge.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
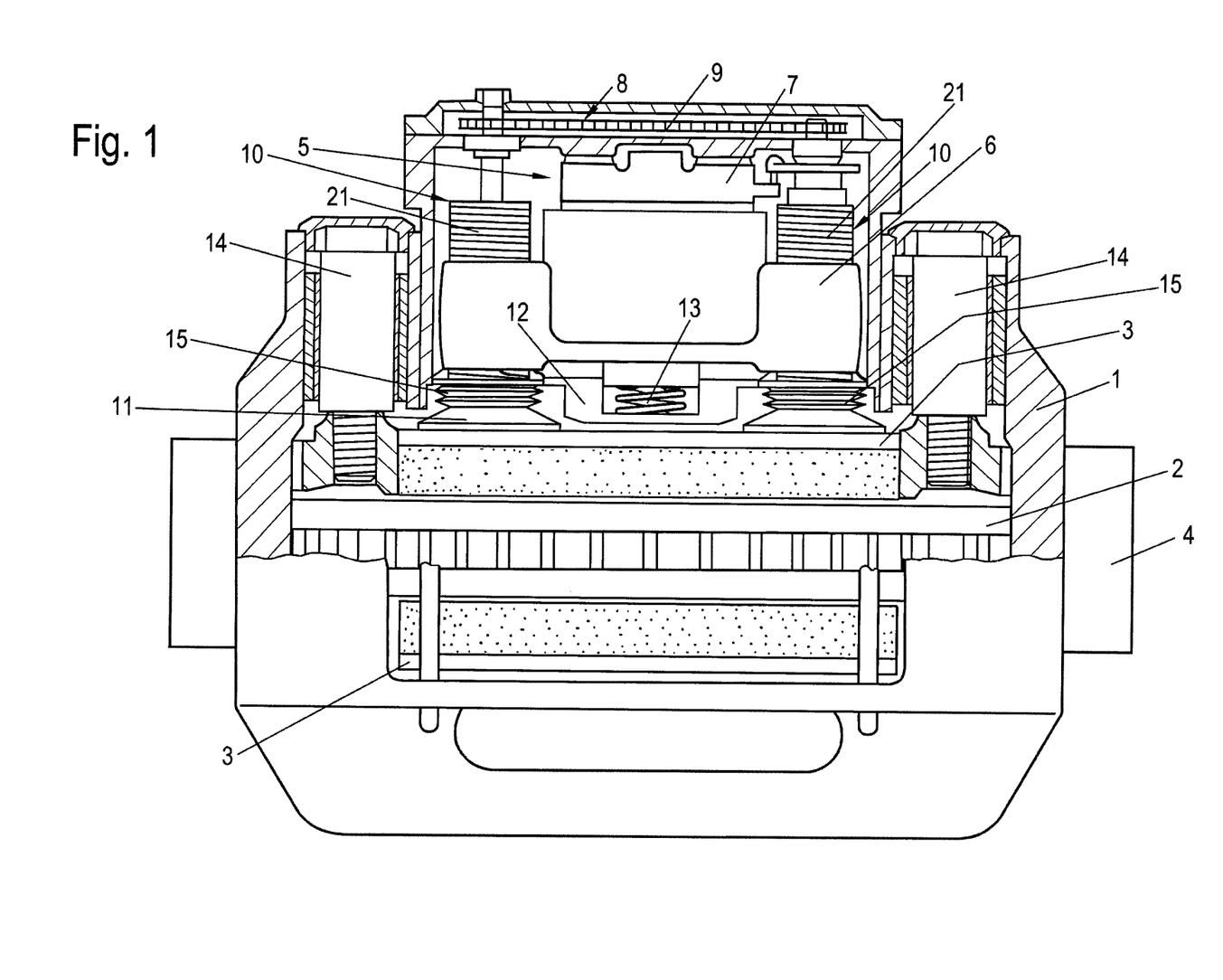
FIG. 1 is a disc brake in a partly sectioned top view.

FIG. 1 shows a disc brake for a utility vehicle (also referred to as a commercial vehicle), having a brake caliper 1 engaging over a brake disc 2 at the vehicle side, being mounted in axially displaceable manner on a brake carrier 4 by means of guide bars 14, with respect to the brake disc 2.

Figure 4:
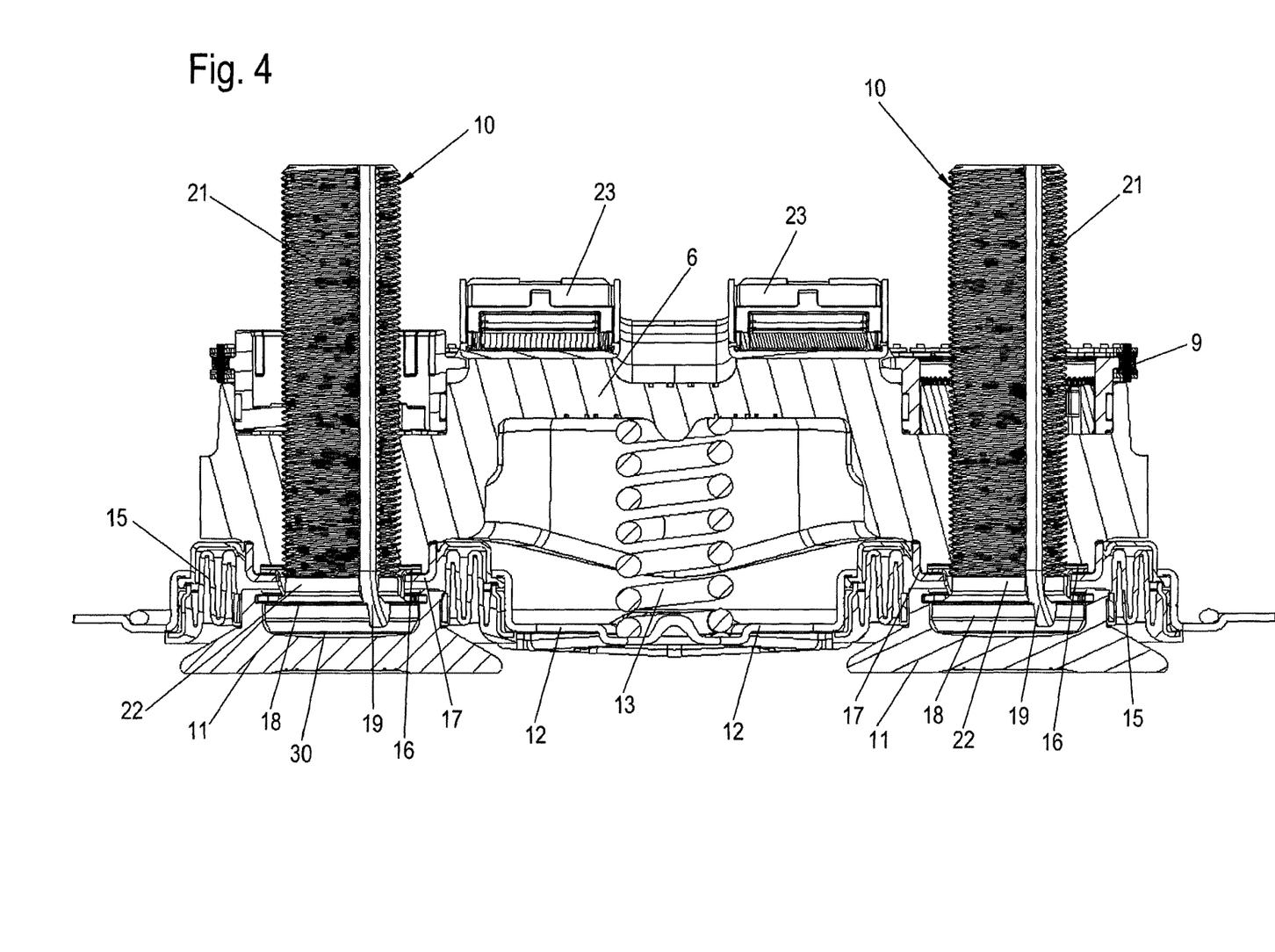
FIG. 4 shows the subassembly of FIG. 2 in a sectional top view.

In the brake caliper 1 there is arranged an application device 5, having a brake lever 7 which acts on a bridge 6 in a braking event, being braced against bearing points 23 (FIG. 4). In this example, two actuating spindles 10 provided with an external thread 21 are screwed into the bridge, being arranged parallel to and at a distance from each other, each of them carrying a pressure piece 11 at their end facing the brake disc 2.

During a braking event, the pressure pieces 11 are pressed via the swiveled brake lever 7 and the bridge 6 against an associated brake pad 3, which brake pad is pressed against the brake disc 2, as is an opposite brake pad 3 on the reaction side.

In order to adjust for a changing clearance, i.e., the spacing between the brake pad 3 and the brake disc 2, a readjusting device 8 is provided, by which the actuating spindles 10 engaging by their external thread 21 with an internal thread of the bridge 6 upon activation of the brake can be rotated in the direction of the brake disc 2.

In order to synchronize the adjustment, the readjusting device 8 has a traction drive 9, with a traction means, for example in the form of a chain.

For the resetting of the bridge 6 after a releasing of the brake, a compression spring 13 is provided, which is braced on the one hand against the bridge 6 and on the other hand against a closure plate 12. The closure plate 12 closes off a receiving space of the brake caliper 1 receiving the application device 5 on the side facing the brake disc 2 and is firmly connected to the brake caliper 1, for example, by a screw connection.

Figure 2:
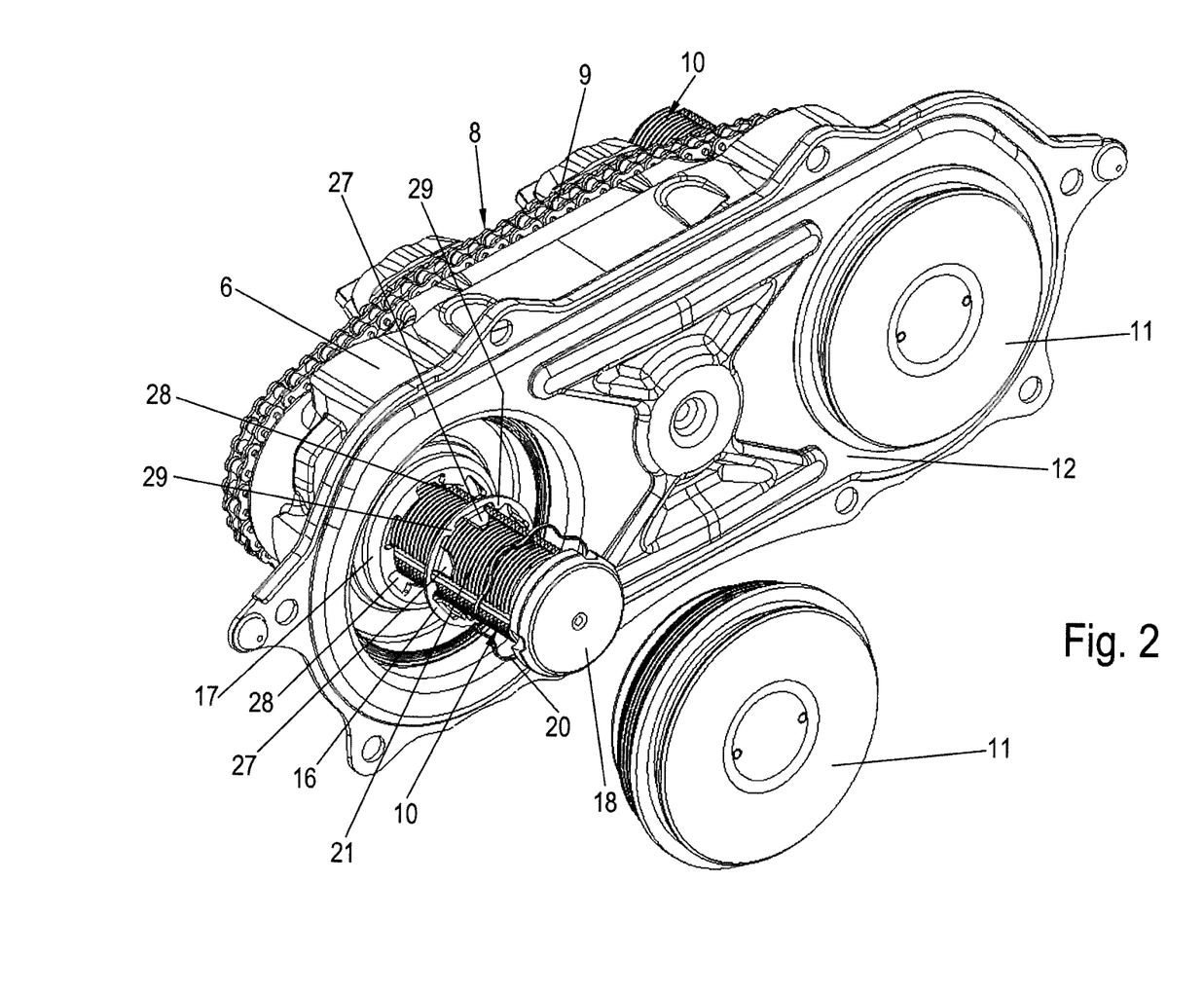
FIG. 2 is a subassembly of the disc brake in a sectional exploded representation.

FIG. 2 shows in an exploded representation a portion of the disc brake which is installed in the brake caliper 1 as a prefabricated unit, complete with the bridge 6, the traction drive 9, the actuating spindles 10 as well as the pressure pieces 11 and the closure plate 12.

Figure 3:
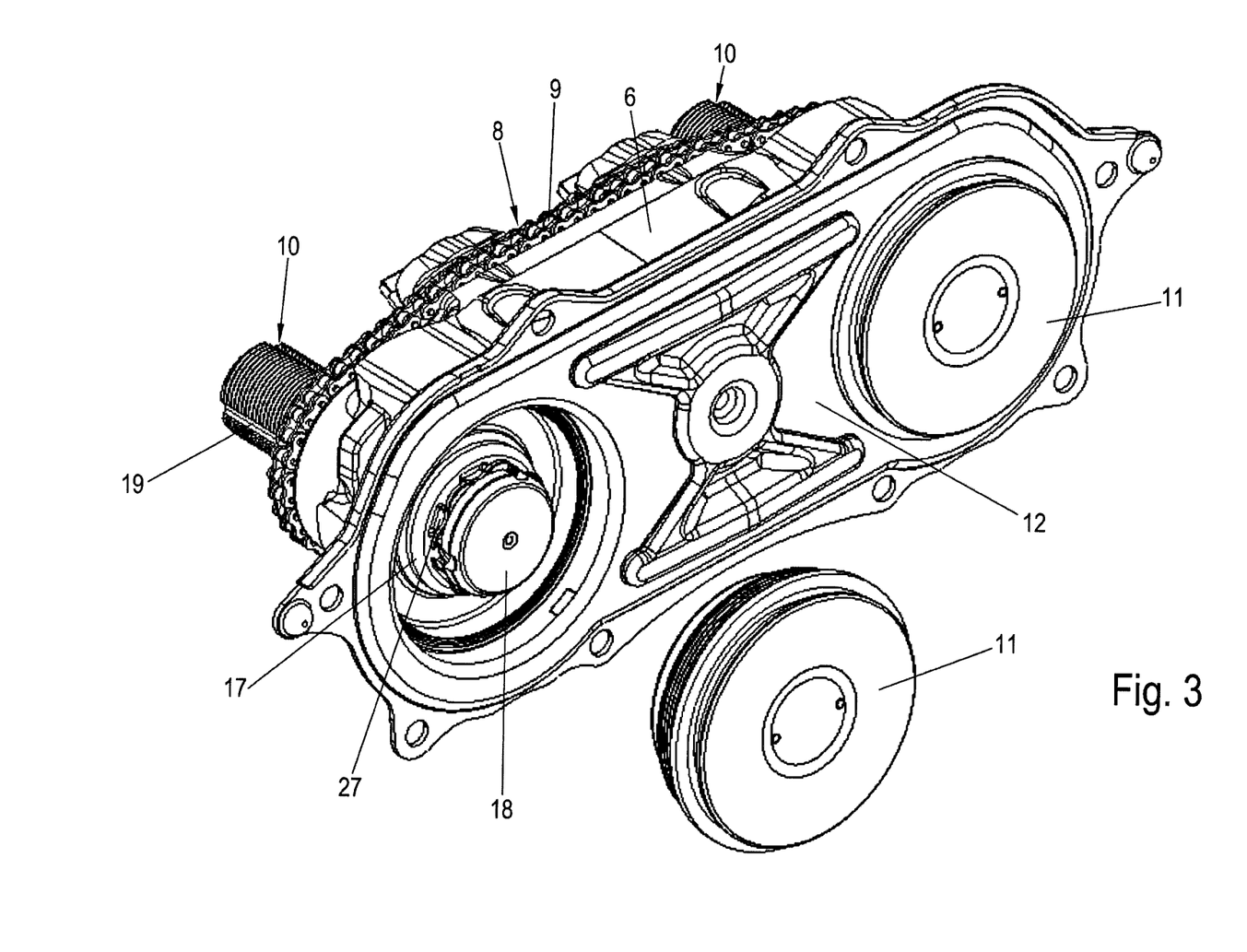
FIG. 3 shows the subassembly, partially completed, in a perspective view.

According to the invention, a securing ring 16 is held on the bridge 6 so as to be secured axially and against rotation. This can be seen in FIG. 3, which shows only the left-side pressure piece 11 in an exploded representation, associated with the corresponding actuating spindle 10, prior to being mounted.

Furthermore, the figures show that the securing ring 16 has several tongues 29 distributed about the circumference and directed radially toward the actuating spindle 10, which in an end position of the actuating spindle 10 screwed in counter to the application direction of the brake engage with a form fit in a thread-free end region 22 (FIG. 4) of the actuating spindle 10 associated with the pressure piece 11.

For the rotational and axial locking of the securing ring 16 there is provided a holding ring 17, which is firmly connected to the bridge 6, especially by friction locking, and which has cut-outs 28 distributed about the circumference and open toward the actuating spindle 10, through which pass tabs 27 of the securing ring 16, being braced against the side walls of the cut-outs 28 for the rotational locking.

Figure 5:
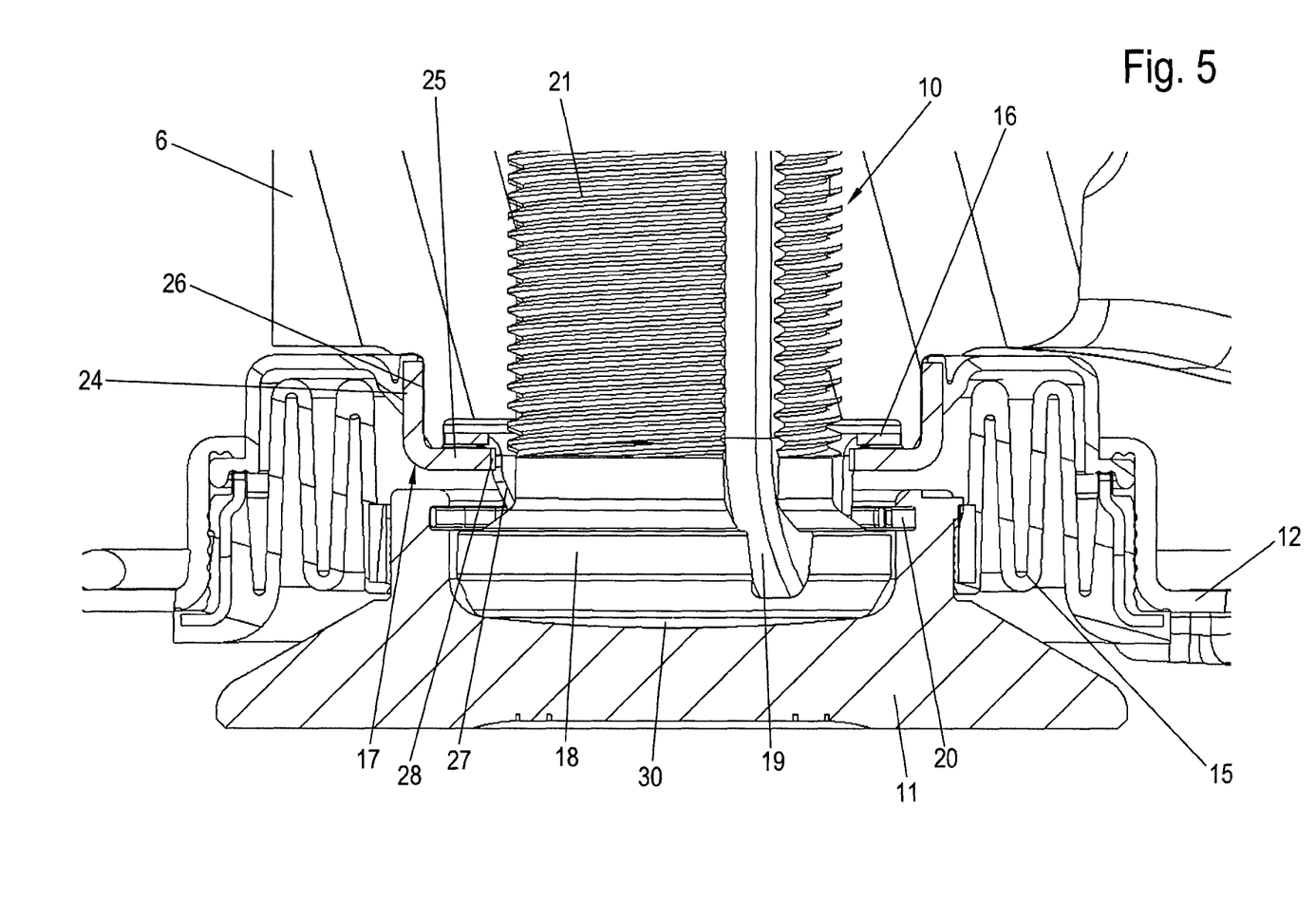
FIG. 5 shows a feature of the subassembly of FIG. 4 in an enlarged top view.

The securing ring 16 is arranged between the holding ring 17 and the bridge 6, as can be seen especially clearly in FIGS. 4 and 5. The tabs 27, moreover, serve for bracing the securing ring 16 against the actuating spindle 10.

FIG. 4 shows the mentioned structural unit in a sectioned top view, both pressure pieces 11 being fastened to the actuating spindle 10, for which a securing element 20 is inserted in an annular groove of the pressure piece 11, and protrudes radially inward far enough to that it forms an end stop for a head 18 of the actuating spindle 10, which is inserted in a receiving opening 30 of the pressure piece 11. The actuating spindle 10 is able to turn relative to the pressure piece 11.

FIG. 5 shows an enlarged feature of FIG. 4 in the area of the left pressure piece 11. It is furthermore noticed here that the holding ring 17 has an axially oriented collar 24, which lies against a shoulder 26 of the bridge 6 in the manner of a press fit, while a radially inward angled contact leg 25 serves for the axial displacement locking of the securing ring 16.

Figure 6:
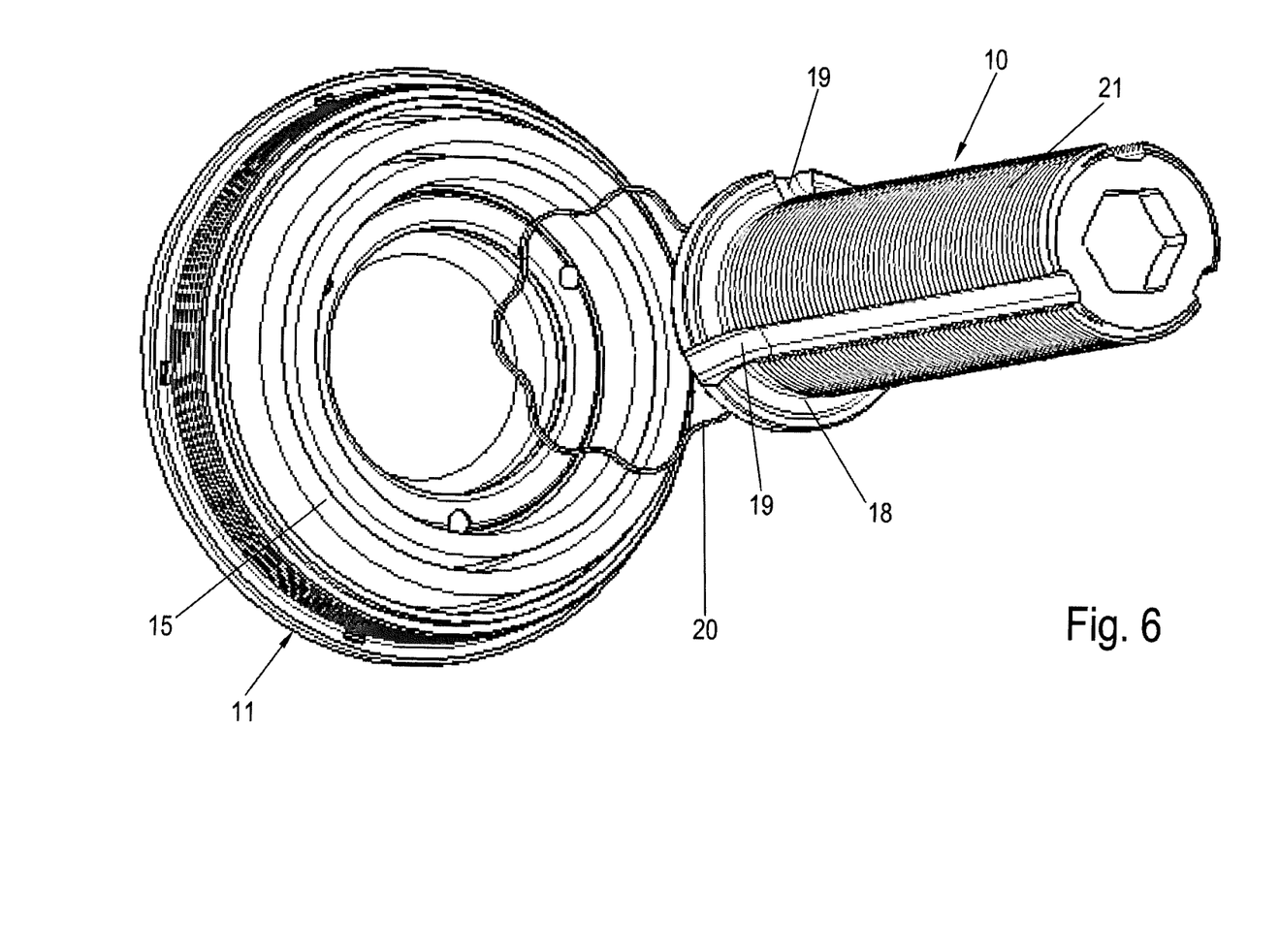
FIG. 6 shows a detail of the subassembly in an exploded representation.
Figure 7:
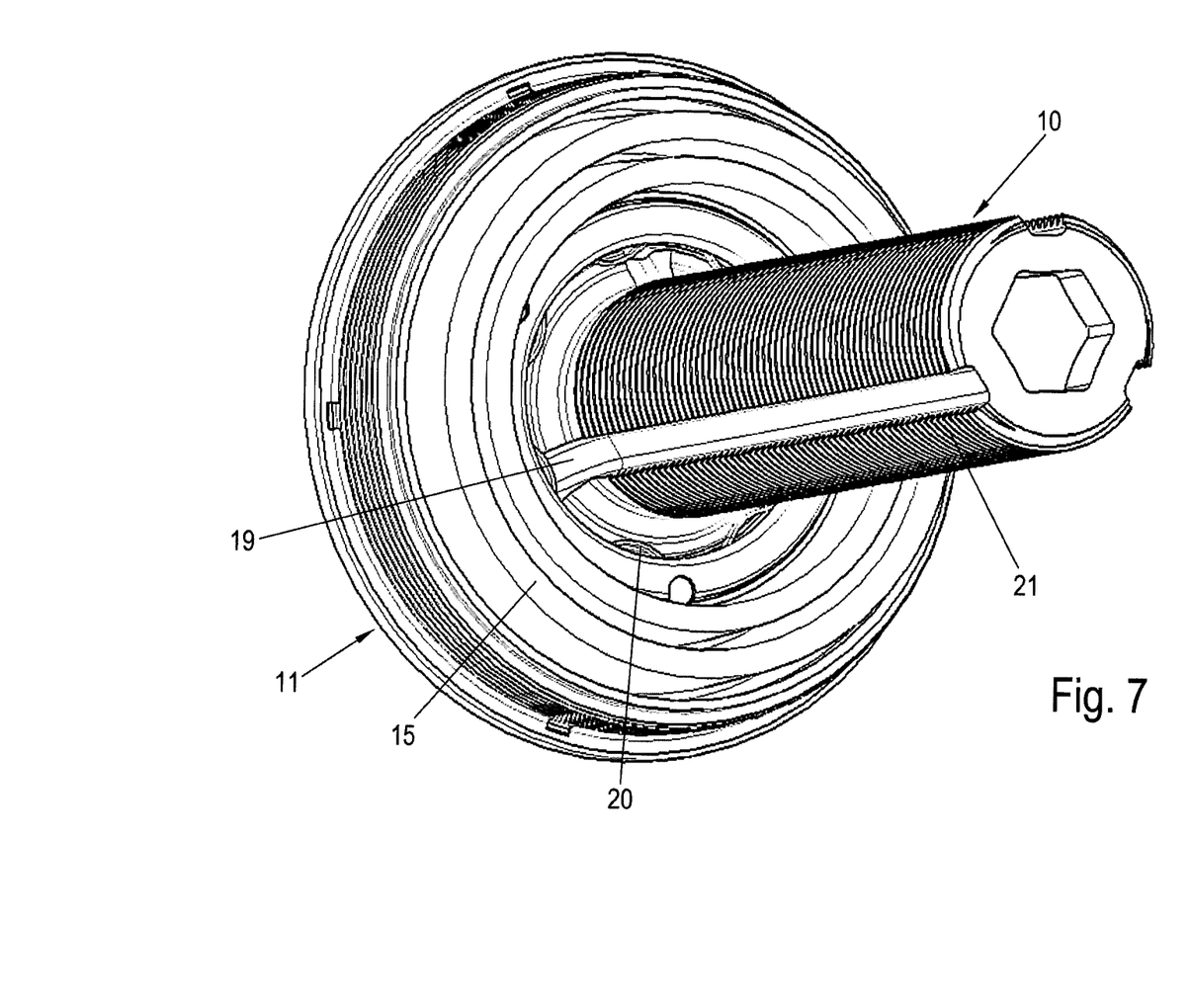
FIG. 7 shows the detail of FIG. 6 in a mounted position.

Here, as well as in FIGS. 6 and 7, each of which represents an actuating spindle 10 with associated pressure piece 11 as a detail, the actuating spindle 10 of the example has three axial grooves 19 arranged at the same angular spacing with respect to each other, running in concave curvature in the thread-free end region 22 of the actuating spindle 10 as far as the head 18.

For the rotational locking of the actuating spindle 10 in the end position screwed in counter to the application direction, as provided by the invention, each tongue 29 engages with the curvature of the axial groove 19, so that a rotation of the actuating spindle 10 is blocked.

In the area outside of the engagement, the tongues 29 lie free with respect to the external thread 21 of the actuating spindle 10, so that the actuating spindle 10 can rotate.

As is very clearly represented in FIG. 2, the tongues 29 are arranged between the tabs 27, the number of tongues 29 being a multiple of the number of axial grooves 19, so that the rotation locking in the end position of the actuating spindle 10 also occurs even with a correspondingly small angle of rotation.

FIGS. 6 and 7 show, as mentioned, the actuating spindle 10 and the pressure piece 11 as a detail, while FIG. 6 represents an exploded view and FIG. 7 shows a mounted position of the pressure piece 11 with the actuating spindle 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

1 Brake caliper
2 Brake disc
3 Brake pad
4 Brake carrier
5 Application device
6 Bridge
7 Brake lever
8 Readjusting device
9 Traction drive
10 Actuating spindle
11 Pressure piece
12 Closure plate
13 Compression spring
14 Guide bar
15 Bellows
16 Securing ring
17 Holder
18 Head
19 Axial groove
20 Securing element
21 External thread
22 Thread-free end region
23 Bearing point
24 Collar
25 Contact leg
26 Shoulder
27 Tab
28 Cut-out
29 Tongue
30 Receiving opening

What is claimed is:

1. A disc brake for a utility vehicle having a brake disc, comprising:
 a caliper which, in use, engages over the brake disc;
 an application device that applies the disc brake, the application device having a displaceably guided bridge with at least one threaded borehole into which an actuating spindle having an external thread is screwed, the actuating spindle passing through a closure plate connected to the caliper, wherein
 the actuating spindle carries a pressure piece rotatable relative thereto by which pressure piece a brake pad is pressable against the brake disc;
 a readjusting device operatively connected to the actuating spindle for adjusting a clearance;
 a securing ring held on the bridge so as to be secured axially and against rotation, wherein
 in an end position of the actuating spindle screwed-in counter to an application direction of the disc brake, the securing ring engages with a form fit in a thread-free end region of the actuating spindle assigned to the pressure piece in order to secure the actuating spindle against rotation.

2. The disc brake as claimed in claim 1, wherein the securing ring is arranged between the bridge and a holding ring held firmly against the bridge.

3. The disc brake as claimed in claim 2, wherein the securing ring has at least one radially inward extending tongue, which is exposed with respect to the external thread and which engages, in the end position of the actuating spindle screwed-in counter to the application direction, with an axial groove of the actuating spindle.

4. The disc brake as claimed in claim 3, wherein the axial groove in the thread-free end region is curved concavely and passes into a head of the actuating spindle, whose outer diameter is greater than the external thread.

5. The disc brake as claimed in claim 4, wherein the securing ring has at least one tab which extends axially in relation to the actuating spindle and which engages with a cut-out of the holding ring, while opposite walls of the cut-out form a rotation stop for the tab.

6. The disc brake as claimed in claim 5, wherein several axial grooves are provided, extending at the same angular distance parallel to each other.

7. The disc brake as claimed in claim 5, wherein several axial grooves are provided, arranged at the same angular distance relative to each other.

8. The disc brake as claimed in claim 5, wherein a number of tongues is a multiple number larger than the number of axial grooves.

9. The disc brake as claimed in claim 8, wherein each tongue is arranged between two tabs.

10. The disc brake as claimed in claim 5, wherein multiple tabs lie against the external thread of the actuating spindle.

11. The disc brake as claimed in claim 2, wherein the holding ring is joined by friction to the bridge.

12. The disc brake as claimed in claim 11, wherein the holding ring has an axially oriented encircling collar, which is held by friction against a shoulder of the bridge.

13. The disc brake as claimed in claim 2, wherein
a contact leg is provided on the holding ring, bent radially inward toward a collar, which covers the securing ring.

14. A disc brake, comprising:
a wear readjusting device for a brake application device having a displaceably guided bridge in which is threadably arranged an actuating spindle having a pressure piece at one end that applies a brake pad against a brake disc,
a securing ring operatively configured to be held on the bridge so as to be secured axially and against rotation, wherein
the securing ring is configured such that, in an end position of the actuating spindle screwed-in counter to an application direction, the securing ring engages with a form-fit in a thread-free end region of the actuating spindle in order to secure the actuating spindle against rotation, and
the thread-free end region of the actuating spindle is assigned to the pressure piece.

15. The readjusting device as claimed in claim 14, further comprising:
a holding ring held firmly against the bridge, wherein
the securing ring is arranged between the bridge and the holding ring.

16. The readjusting device as claimed according to claim 15, wherein
the securing ring has at least one radially inward extending tongue that is not engaged with an external thread of the actuating spindle but which does engage with an axial groove of the actuating spindle when the actuating spindle is in an end position screwed-in counter to the application direction.

17. The readjusting device according to claim 15, wherein
an axial groove is in the thread-free end region of the actuating spindle, and
the axial groove is curved concavely and passes into a head of the actuating spindle, which head has an outer diameter greater than an outer diameter of the external thread.

18. The readjusting device according to claim 17, wherein
the securing ring has at least one tab extending axially in relation to the actuating spindle, and
the at least one tab engages with a cut-out of the holding ring, while opposite walls of the cut-out form a rotational stop for the tab.

19. The readjusting device according to claim 18, wherein
several axial grooves are provided about a circumference of the adjusting spindle.

20. The readjusting device according to claim 19, wherein
a number of tongues is provided on the securing ring, and
the number of tongues is a multiple number larger than the number of axial grooves.

\* \* \* \* \*